(12) United States Patent
Steinmetz

(10) Patent No.: US 9,794,373 B1
(45) Date of Patent: Oct. 17, 2017

(54) SYSTEM AND METHOD FOR ENSURING ANONYMITY OF USER TRAVEL AND NAVIGATION DATA THROUGH HASHING

(71) Applicant: GOOGLE INC., Mountain View, CA (US)

(72) Inventor: William Henry Steinmetz, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 910 days.

(21) Appl. No.: 13/931,061

(22) Filed: Jun. 28, 2013

(51) Int. Cl.
*G06F 15/16* (2006.01)
*H04L 29/06* (2006.01)

(52) U.S. Cl.
CPC .................................. H04L 67/42 (2013.01)

(58) Field of Classification Search
CPC ....................................................... H04L 67/42
USPC ................................................. 709/203, 224
See application file for complete search history.

(56) References Cited

U.S. PATENT DOCUMENTS

| | | |
|---|---|---|
| 6,349,257 B1 | 2/2002 | Liu et al. |
| 7,400,972 B2 | 7/2008 | Kozak |
| 7,716,285 B2 | 5/2010 | Boyd |
| 8,200,847 B2 | 6/2012 | Lebeau et al. |
| 8,340,898 B2 | 12/2012 | Currie et al. |
| 8,364,540 B2 | 1/2013 | Soroca et al. |
| 2010/0211304 A1 | 8/2010 | Hwang et al. |
| 2012/0052871 A1* | 3/2012 | Cochran ............... H04W 4/028 455/456.1 |
| 2012/0144452 A1* | 6/2012 | Dyor .................. H04L 63/0884 726/4 |
| 2012/0329507 A1* | 12/2012 | Watanabe ............. H04W 24/10 455/517 |
| 2013/0261954 A1* | 10/2013 | Boschker ............... G01C 21/00 701/410 |
| 2014/0025432 A1* | 1/2014 | Thomassen ....... G06F 17/30241 705/7.34 |

OTHER PUBLICATIONS

Agamennoni et al., "Robust and Accurate Road Map Inference," IEEE international Conference on Robotics and Automation Anchorage Convention District (2010).

(Continued)

*Primary Examiner* — Bryan Lee
*Assistant Examiner* — Oluwatosin Gidado
(74) *Attorney, Agent, or Firm* — Marshall, Gerstein & Borun LLP

(57) ABSTRACT

For a segment of a route, a navigation data gathering system and method may progressively increment the precision of data analysis in proportion to the number of people actively on a route segment. Navigation data may be anonymized to preclude the possibility of correlating navigation data with personal data to track users or infer private information. Further, the system or method may determine if information for a route segment can be used at all based on the number of users of that segment. If the number of users does not exceed a threshold, the information collected on that route may not be used for other purposes. Thus, the system and method may use navigation data related to a busy section of an interstate highway at the level of precision with which the data is gathered, but reduce the level of precision of data available for a rarely used road segment.

6 Claims, 9 Drawing Sheets

(56) References Cited

OTHER PUBLICATIONS

BatchGeo, "Protect Your Map Information," (2013). Retrieved from the Internet on Apr. 14, 2013: URL:http://batchgeo.com/features/security.

Maps—Great Smoky Mountains National Park (2013). Retrieved from the Internet on Apr. 14, 2013: URL:http://www.nps.gov/grsm/planyourvisit/maps.htm.

Veneziano, "Accuracy Evaluation of LIDAR-Derived Terrain Data for Highway Location" Center for Transportation Research and Education, Iowa State University (2010).

\* cited by examiner

SYSTEM AND METHOD FOR ENSURING ANONYMITY OF USER TRAVEL AND NAVIGATION DATA THROUGH HASHING

FIELD OF TECHNOLOGY

The present disclosure relates generally to systems and methods for ensuring user anonymity when using travel and navigation data in a digital mapping system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of electronic devices, such as mobile phones, desktop and portable computers, car navigation systems, hand-held Global Positioning System (GPS) units, etc. support software applications that display interactive digital maps. Depending on the software application and/or user preferences, digital maps may display a variety of map content, such as topographical data, street and road data, urban transit information, traffic data, weather data, etc. Some software applications also receive geographic or navigation queries from users, such as requests to search for coffee shops in a certain area or requests for directions from a current location to a particular coffee shop, and display search results on the digital map.

To personalize or customize map content, such as navigation routes, information regarding points of interest, advertisements, etc., some providers of map content attempt to gather and store data related to specific clients (e.g. client locations, client usage history, etc.). Gathering and storing individual user's data raises privacy concerns that should be addressed.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

User's travel and/or navigation information, such as a trip from point A to point B, may be hashed to a set of values with a non-zero rate of false positives, i.e., the probability that two different route segments are hashed to the same value. As a result, the hash values may not be easily mapped back onto geography. In other words, originally deterministic data may be converted into probabilistic data. This technique may protect users' confidential data.

For a segment of a route, a navigation data gathering system and method may receive an indication of consent to analyze navigation data. The system and method may further receive navigation data including a precise geographic location at a remote mapping server from a client computing device via a computer network. The received precise geographic location may be represented by map content data stored at the remote mapping server. The precise geographic location may include a variable length. The system and method may further map the received precise geographic location to a fixed data set. The fixed data set may include a fixed length.

According to still another embodiment, a computing apparatus may ensure anonymity of travel and navigation data. First receiving means may be configured to receive an indication of consent to analyze navigation data. Second receiving means may be configured to receive navigation data including a precise geographic location at a remote mapping server from a client computing device via a computer network. The received precise geographic location may be represented by map content data stored at the remote mapping server. The precise geographic location may include a variable length. Mapping means may be configured to map the received precise geographic location to a fixed data set. The fixed data set may include a fixed length.

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

Generally speaking, computing systems can implement the techniques of the present disclosure to customize map content based on user specific data in a secure private data model. The secure private data model isolates user specific data on respective client devices, such that network servers do not have access to confidential information or cannot otherwise infer confidential information. If any data is gathered from client devices, the data is anonymized by adjusting the precision of data analysis or level of data gathering. This adjustment ensures that the data precision is proportional to the number of clients from which the data is gathered. Further, data gathered from client devices by network servers may be hashed such that at least some of the data from multiple devices is hashed to the same values, thus ensuring anonymity of client devices.

System Overview

Figure 1:
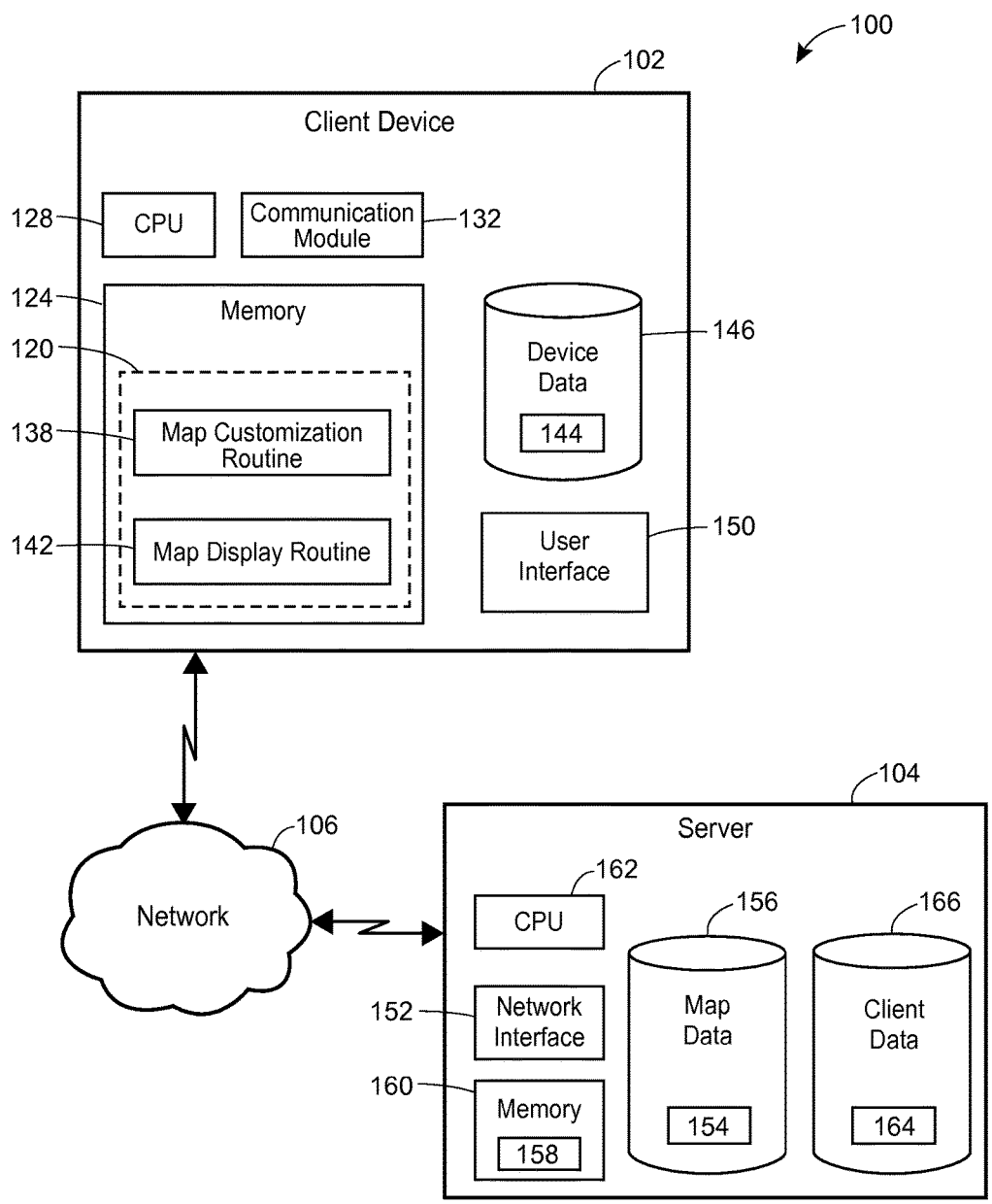
FIG. 1 illustrates an example computing system that may utilize secure private data models to customize map content.

FIG. 1 illustrates an example computing system 100 in which map content may be customized based on user specific data in a secure private data model. The example computing system 100 includes a client device 102 and a server 104 communicatively coupled to a network 106. The network 106 may be a proprietary network, a secure public internet, a virtual private network or some other type of network, such as dedicated access lines, plain ordinary telephone lines, satellite links, combinations of these, etc. Where the network 106 comprises the Internet, data communications may take place over the network 106 via an Internet communication protocol.

In some embodiments, the client device 102 includes a mapping application 120 stored in a memory 124 and executed by a CPU 128. The mapping application 120 may receive map data from the server 104, via a communication module 132, generate customized map content, and display customized map content to a user of the client device 102. For example, the customized map content may include customized navigation routes, point of interest information, geographic query matches, indications of traffic, advertisements, etc.

The mapping application 120 may utilize a map customization routine 138 to customize map content based on user specific data 144 in a device database 146. For example, the map customization routine 138 may use a current or recent client device location that was recorded in the user specific data 144 to modify a default navigation route according to current traffic conditions. Thus, the client device 102 may customize the map content without any transfer of the user specific data 144 from the client device 102 to the server 104 or any other component outside the device 102.

The mapping application 120 may also utilize a map display routine 142 to display the customized map content via a user interface 150. For example, the user interface may include devices to facilitate user interaction with the mapping application, such as a keyboard, touch screen, one or more buttons, trackballs, etc., and display devices for displaying interactive maps, such as liquid crystal displays (LCD), light emitting diodes (LED), organic light-emitting diodes (OLED), ePaper displays, etc.

In some embodiments, the server 104 transfers default (i.e. not customized) map content 154 to the client device 102 via the network interface 152. The default map content 154, stored in a map database 156, may include map feature data, such as points of interests, geometric shapes, geographic coordinates, etc., for example. In addition, the server 104, or any other suitable server, may send supplementary information associated with additional map data layers, such as traffic, weather, accident, etc. information, to the client device 102, in some embodiments. For example, the server 104 may retrieve information indicating current traffic conditions from a third party server (not shown) and send at least some of the information indicating current traffic conditions to the client device 102 (e.g. along with the default map content 154).

In some other embodiments, a server-side customization routine 158, stored in a server memory 160 and executed by a server CPU 162, may customize map data 154 before sending the map data 154 to the client device 154. For example, the server-side customization routine 158 may use user specific data 164, stored in a client database 166, to customize or personalize the map data 154 before sending the map data to the client device 102. In turn, the client device 102 may display a rendering of the customized map data 154 on the user interface 150, or the client device 102 may further customize the map data 154 before display, for example. In certain embodiments, the user specific data 164 is anonymized and/or hashed such that the use of user specific data 164 may not violate the privacy of a user, as described with reference to FIGS. 4, 5, 6A, 6B, 6C, and 7, below.

Secure Private Data Model

Figure 2:
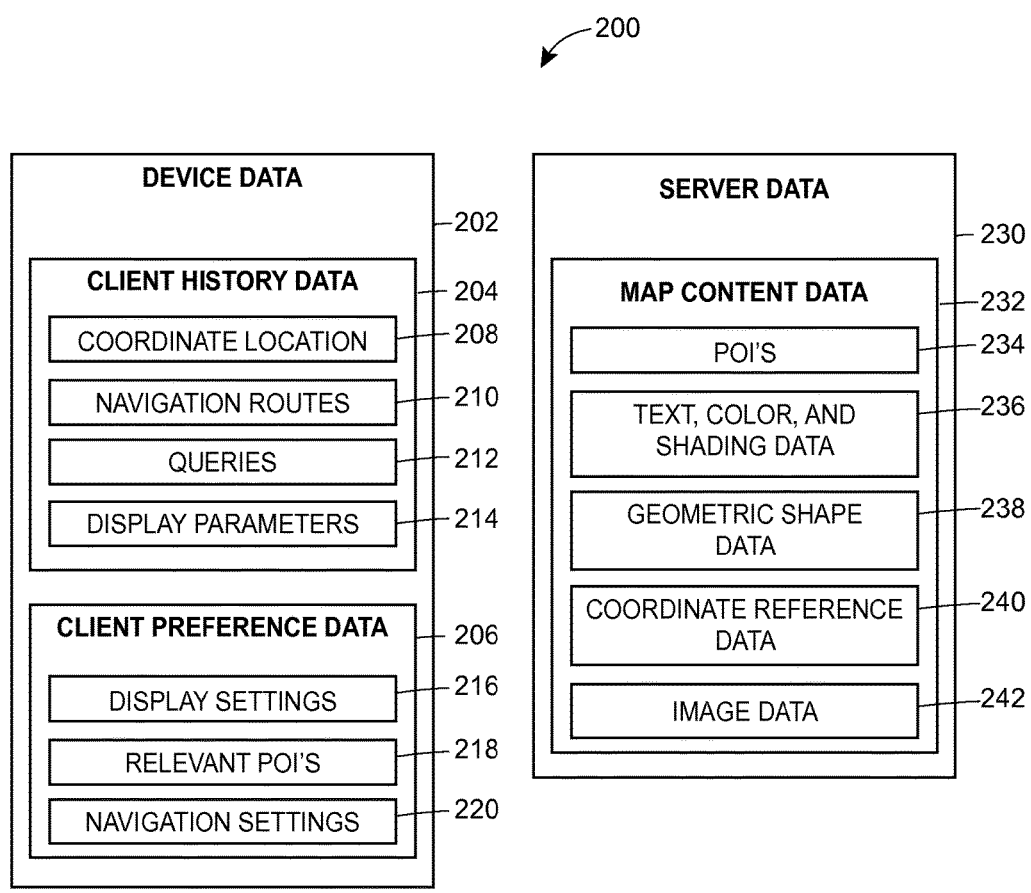
FIG. 2 illustrates an example secure private data model that isolates client data from a network server, where the example secure private data model can be utilized by the computing system illustrated in FIG. 1.

FIG. 2 illustrates an example secure private data model 200 in which user specific data is isolated from a network server. In an embodiment, a device database 202 disposed at a client device, such as the client device 102, stores user specific data including client history data 204 and client preference data 204 without storing any user specific data at the network server. For example, the client history data 204 may include geographic coordinate location data 208 (e.g. home and work locations), navigation route data 210 for a history of navigation actions using the client device (e.g. directions, line segments, etc.), a history of geographic query data 212 using the device (e.g. addresses, business names, etc.), and display parameter data (e.g. zoom levels, reference points, etc.). Also, the client preference data 204 may include display setting data 216 (e.g. preferred viewports), relevant POI data 218 (e.g. based on user input or frequently searched POI's), and navigation setting data 220 (e.g. preferred areas or roads), for example. In the example secure private data model 200, the client history data 204 and the client preference data 206 may be stored in the device database 202, to isolate this sensitive data from network servers.

A server database 230, in the example secure private data model 200, may only store default map content data 232. For example, the map content data 232 may include POI data 234 (e.g. reference coordinates, business names, addresses, etc.), text, color, and shading data 236, geometric shape data 238 (e.g. building shapes, three-dimensional feature models, vector data for the client device 102 to render various shapes, etc.), coordinate reference data 240 (e.g. locations of landmarks), and image data 242 (e.g. satellite images of geographic locations). User anonymity may be preserved because this map content data 232 is never associated with any individual client.

Figure 3:
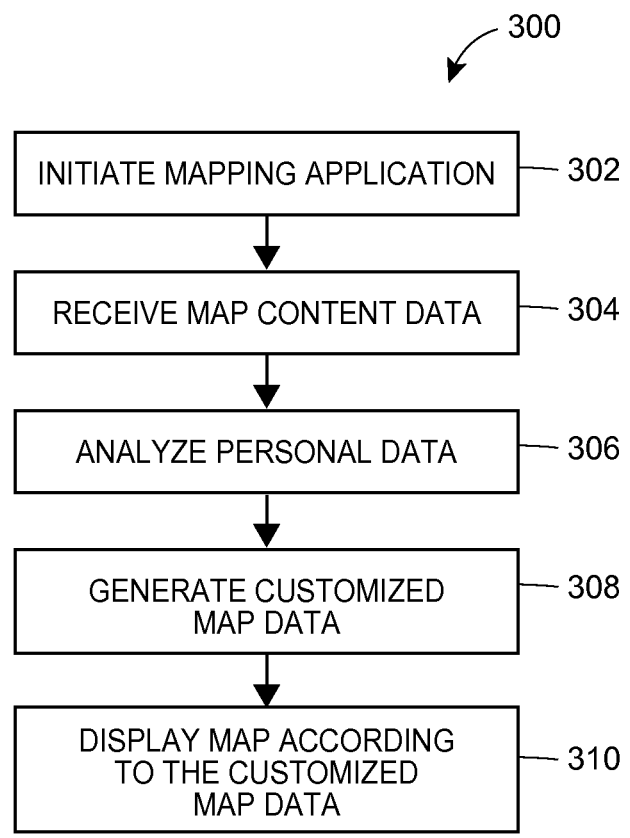
FIG. 3 is a flow diagram of an example method for utilizing a secure private data model, such as the secure private data model illustrated in FIG. 2, to customize map content.

FIG. 3 is a flow diagram of example method 300 for customizing map data by analyzing user specific data in a secure private data model, such as secure private data model 200. The method 300 may be implemented in the computing system 100, for example.

At block 302, an instruction stored in the memory 124 may be executed on the processor 128 to initiate a mapping application, such as mapping application 120. For example, the mapping application 120 may be initiated by a user clicking or tapping on a mapping application icon displayed via the user interface 150. Alternatively, a user may initiate a mapping application by navigating to a web page via a web browser application executed on the client device.

At block 304, the server 104 may execute an instruction to receive a request for mapping data sent from the client device 102 initiating the mapping application at block 302. At the client device, the request for mapping data may include both user specific data and data identifying default mapping data. However, the client device 102 may remove the user specific data from the request for mapping data before sending only the data identifying the default mapping data to the network server. The client device 102 may then send the data identifying default map content data from the request to the network server, and then store the user specific data in the device database. In response to receiving the data identifying default map content data, block 304 may execute an instruction to identify default map content data corresponding to the received data, store the received data in the network server memory without storing any user specific data, and send map content data to the client device 102 via a computer network, such as the computer network 106. For example, the client device 102 may receive default (i.e., not yet customized) map content data 154 from the server 104, and, in certain embodiments, the server 104 may send the map content data 154 to the client device 102 in response to a geographic query. For example, a user of the client device 102 may enter, via the user interface 150, a geographic query, such as a geographic location query, a navigation query, a traffic query, etc. In response to communication of the query from the client device 102 to the server 104, the server 104 may send the client device 102 relevant portions of the map content data 154.

Next (block 306), user specific data may be analyzed for customization of the default map content data. For example, a processor 128 of the client device 102 may execute the map customization routine 138 to analyze user specific data 144, stored in the device database 146 and identify appropriate customizations for the default map content data received at block 304.

In one scenario, the client device 102 may receive, from server 104, a default navigation route for driving a car from an address in Chicago, Ill. to Chicago Midway airport. The default navigation route may indicate driving on a certain interstate highway in the example scenario. However, upon analyzing client history data stored on the client computing device 102, the map customization routine 138 may identify a user preference to drive on a different interstate highway based on a frequency of travel on the different interstate highway, for example. Also, upon analyzing a current client device location, the map customization routine 138 may identify a faster route to Chicago Midway Airport based on current traffic conditions, for example. Still further, the map customization routine 138 may reduce or increase the number of steps in a navigation route and/or generalize navigation steps, in an implementation. For example, the map customization routine 138 may change multiple detailed directions to a generalized step, such as "Head to I-5 north," based on the familiarity of the user with a particular geographic area, as determined from an analysis of user history data.

At block 308, the client device 102 may execute an instruction to customize the default map content data according to the analysis of block 306. The customization of the map content data may include, by way of example and without limitation: (i) substituting, adding, or deleting line segments, geometric shapes, labels, markers, icons, vector data, etc., (ii) changing colors, highlights, zoom levels, shading, etc., (iii) modifying interactive elements such as virtual buttons, scrollbars, drop-down menus, etc.; or (iv) adding or deleting additional data layers of supplementary information, such as traffic information, advertisements, etc. In the above example scenario, the customization of map data may involve substituting multiple line segments in the navigation route according to current traffic conditions.

At block 310, the client device 102 may execute an instruction to display the customized map content data on a user interface of the client device. For example, the client device 102 may display a customized navigation route as part of an interactive digital map, as a series of text-based directions, as line segments overlaid on satellite images, etc. In some embodiments, the customization of map content data at block 308, and subsequent display, includes adapting the map content data for specific types of client device hardware/software. For example, the map customization routine 138 may modify the resolution, zoom levels, size of icons, etc. for visually appealing display or according to user preferences on one of a smart phone, tablet computer, or laptop/desktop computer.

Level of Data Gathering/Precision of Data Analysis

Figure 4:
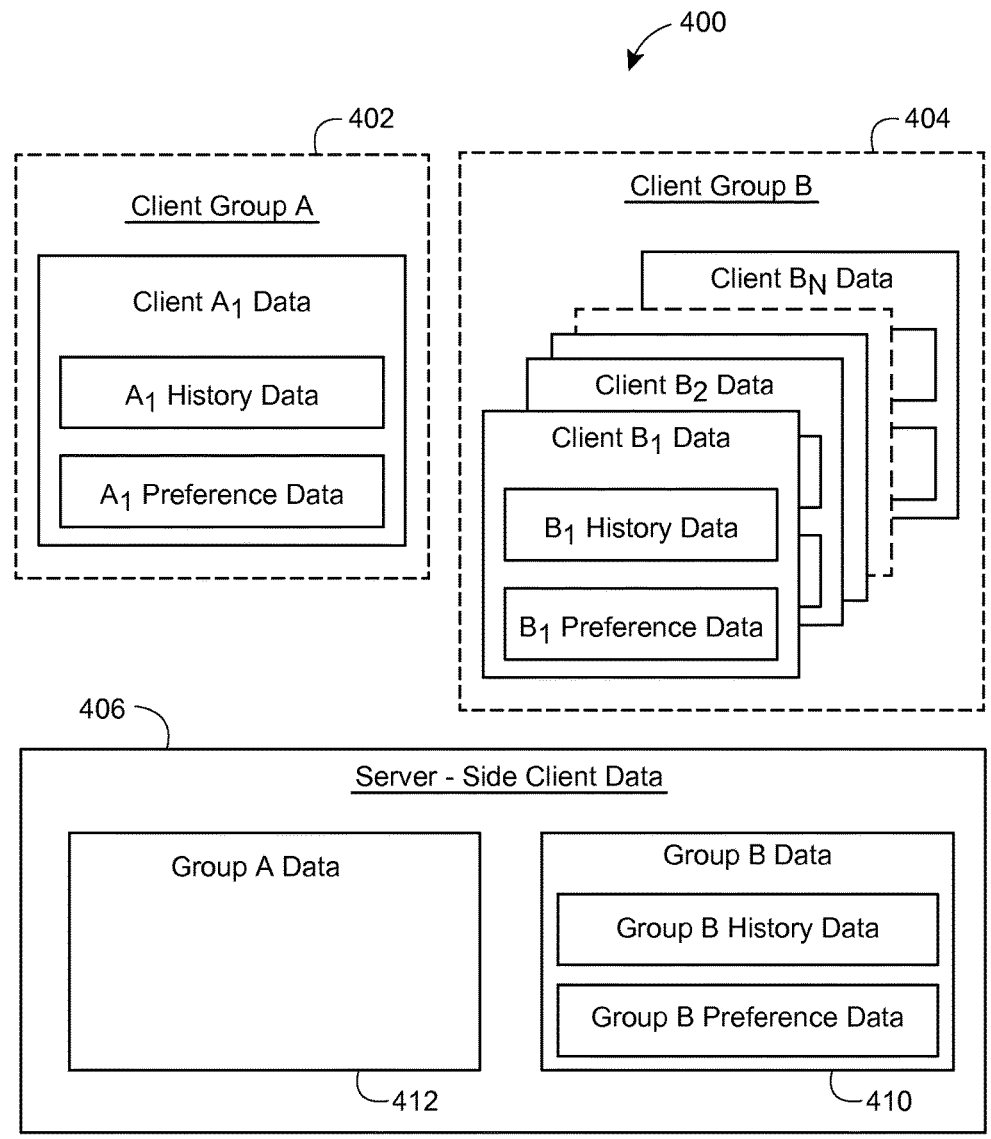
FIG. 4 illustrates an example secure private data model in which the level of data gathering or precision of data analysis may be varied, where the example secure private data model can be utilized by the computing system illustrated in FIG. 1.

As generally described above, although some secure private data models completely isolate all user specific data on client devices, the techniques of the current disclosure may utilize data models that ensure the anonymity of clients while, at the same time, allowing user specific data to be analyzed by a server. FIG. 4 illustrates an example of such a secure private data model 400 in which some user specific data may be anonymously analyzed by a server.

The example secure private data model 400 includes a first group of client devices 402 (client group "A") and a second group of client devices 404 (client group "B"). In one scenario, client group A may include any client devices that are currently on a first road segment or within a first geographic area and client group B may include any client devices that are currently on a second road segment or within a second geographic area, for example. In the example secure private data model 400, each of the clients in group A and each of the clients in group B may generate client history data and client preference data, which a server may potentially gather for analysis.

If a server gathers data from a group of clients, the potential for the server 104 to track an individual client device, or otherwise violate privacy, may increase as the number of clients in the group decreases or as the precision of data analysis increases. In an illustrative example, it may be desirable or informative to analyze client data to calculate speeds of vehicles on particular road segments. However, if the client group A includes only one client, gathering and analyzing data from the client group A corresponds to tracking the speed of a single client. If a client group includes two clients, gathering and analyzing data from that client group may involve an average of the speed of the two clients, yet the average is influenced greatly by each individual client. However, if a client group includes many (e.g. hundreds) of clients, an average speed varies little with single client deviations in speed. Thus, the analysis of the client group with many clients is an analysis of user specific data in which individual clients are anonymized (i.e. not individual identifiable), in the example.

In another illustrative scenario, a certain type of data analysis requires high precision data and another type of data analysis requires only low precision data. For example, a type of data analysis that attempts to infer traffic conditions may require data from client devices indicating vehicle speeds with high precision. On the other hand, a type of data analysis that merely attempts to count a number of events, such as wrong turns or off road indications during navigation, does not require data from client devices indicating locations with high precision. Rather, a data analysis that counts numbers of events may use hashed, or otherwise anonymized data, with low precision, in the example scenario. Further details of hashing, or anonymizing, data are discussed with reference to FIGS. 6A, 6B, 6C, and 7.

As illustrated in FIG. 4, client group A may include a single client device $A_1$. For example, client group A may correspond to a section of a rural road with little traffic. On the other hand, client group B may include N clients (client devices $B_1$-$B_N$). For example, N may be a large number when the client group B represents an urban section of highway at rush hour.

A server, such as server 104, may only gather, or analyze with high precision, user specific data from client groups with a number of clients equal to or above a threshold, in an embodiment. In the secure private data model 400, the server-side client database 406 may include gathered data 410 from client group B for analysis. However, the server-side client database 406 may only include an empty data block 412 corresponding to client group A, because the number of clients in client group B is equal to or below a threshold value.

Figure 5:
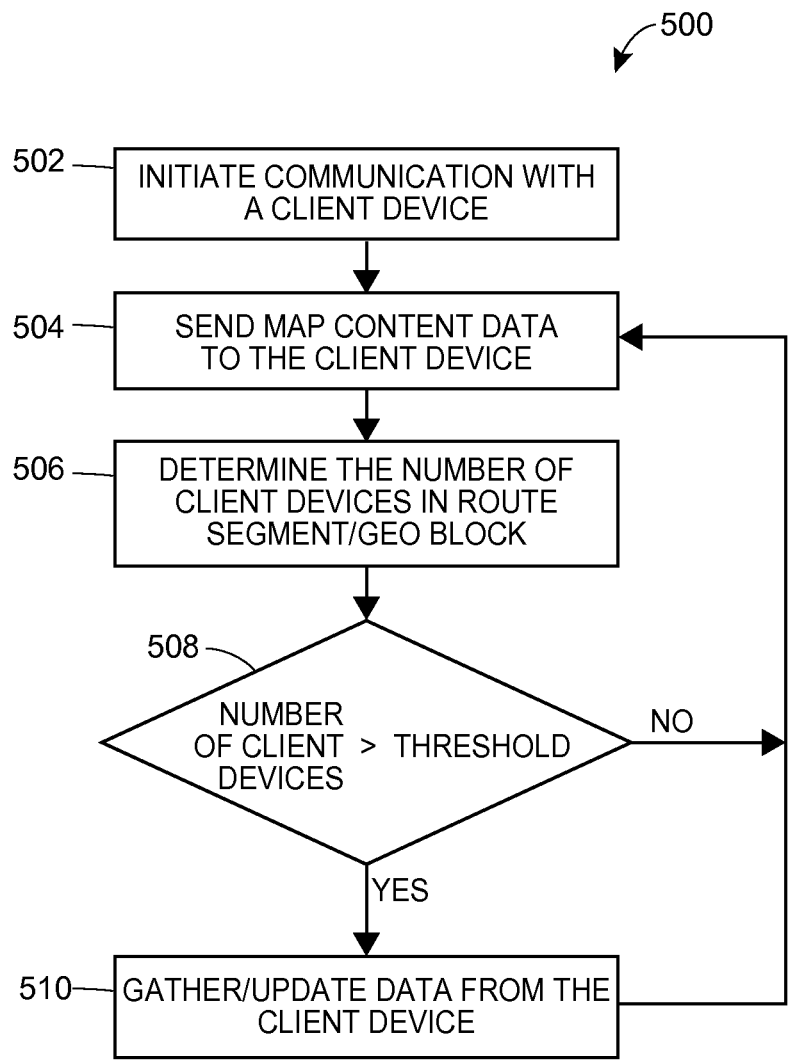
FIG. 5 is a flow diagram of an example method for utilizing a secure private data model, such as the secure private data model illustrated in FIG. 4, based on a number of client devices.

FIG. 5 is a flow diagram of an example method 500 for determining a level of data gathering or precision of data analysis based on the number of clients in a group. The method 500 may be implemented in the example computing system 100, for example.

At block 502, a processor of a particular client device may execute an instruction to initiate mapping system communication. For example, a client device 102 may instantiate a mapping application or sends a geographic query to a map data server 104, as discussed above.

Next (block 504), in response to the mapping data request (e.g., block 502), a processor of the mapping server 104 may send map content data to the client device 102. In some embodiments, the map content data may be associated with a certain type of data analysis. For example, block 504 may send map content data that includes navigation routes in response to a server (e.g., mapping server 104) executing an instruction to analyze navigation data to count the number of wrong turns made during navigation and/or the areas in which wrong turns are made.

Next (block 506), the method 500 may execute an instruction to determine the number of client devices in a group of client devices. In some embodiments, the method 500 may determine the groups and associated numbers of client devices in a group based on the type of map content sent to client devices. For example, the server 104 may execute an instruction to send navigation routes, assembled from route segments, to multiple client devices and may execute an instruction to group client devices by route segments. Block 506 may cause the server 104 to count the number of client devices to which a certain route segment has been sent to determine a number of clients in a group, for example. Alternatively, block 506 may cause the server 104 to group clients by geographic area, in an embodiment. For example, a map content server may execute an instruction to group together all client devices to which the map content server has sent maps of downtown Chicago.

At block 508, the system 100 may execute an instruction to determine if the number of client devices to which the particular client device belongs is above a threshold. For example, the threshold may be a pre-determined, or otherwise determined, number of client devices (e.g., 10, 100, etc.). In some embodiments, the threshold depends on a specific type of data analysis, and, in other embodiments, the threshold includes multiple thresholds corresponding to multiple types of data analysis. For example, block 508 may cause the server 104 to determine if the number of client devices is greater than a first threshold (e.g., 50 devices) associated with traffic-related data analysis and if the number of client devices is greater than a second threshold (e.g. 10 devices) associated with a count related data analysis. In some embodiments, the thresholds associated with different data analyses are proportional to the precision of data required for those data analyses.

In some embodiments, a "heat map" may be used to determine levels of data gathering and/or precision of data analyses. For example, block 508 may cause the server 104 to maintain a heat map, or matrix representation, grid, or table, of values representing the current number of client computing devices 102 present in various geographic areas. The server 104 may then refer to such a heat map to determine the level of data gathering or precision of data analysis for groups of devices in those various geographic areas. For example, the server 104 may record the current number of client devices 102 in Client Group "A" 402 and Client Group "B" 404 as two values in respective cells of a heat map, where a cell may represent a geographic area or route segment.

If block 508 determines that the number of client devices is below the threshold value, the flow may revert back to block 504. However, if the number of client devices is above the threshold, the method 500 may cause the mapping server 104 to initiate data gathering and/or analysis for the particular client device (block 510). In some embodiments, the number of client devices may be greater than some thresholds and less than other thresholds. In such a case, the server 104 may gather data from the client device 102 to be analyzed for certain purposes while any data gathered from the client device 102 may not be used for other purposes (e.g. data analyses associated with thresholds greater than the number of client devices).

Data Hashing

Figure 6A:
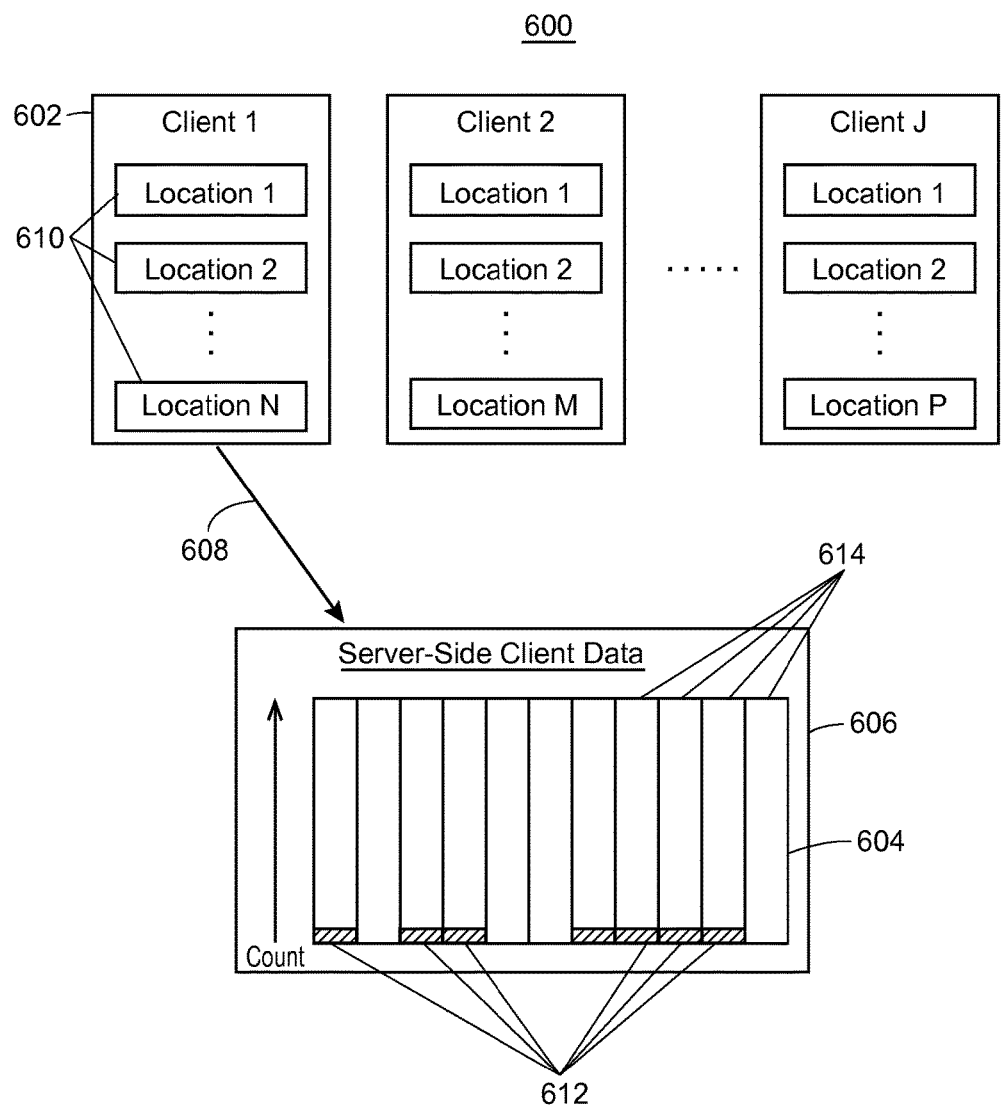
FIGS. 6A, 6B, and 6C illustrate an example secure private data model that maps client data to a fixed data set, where the secure private data model may can be utilized by the computing system illustrated in FIG. 1.
Figure 6B:
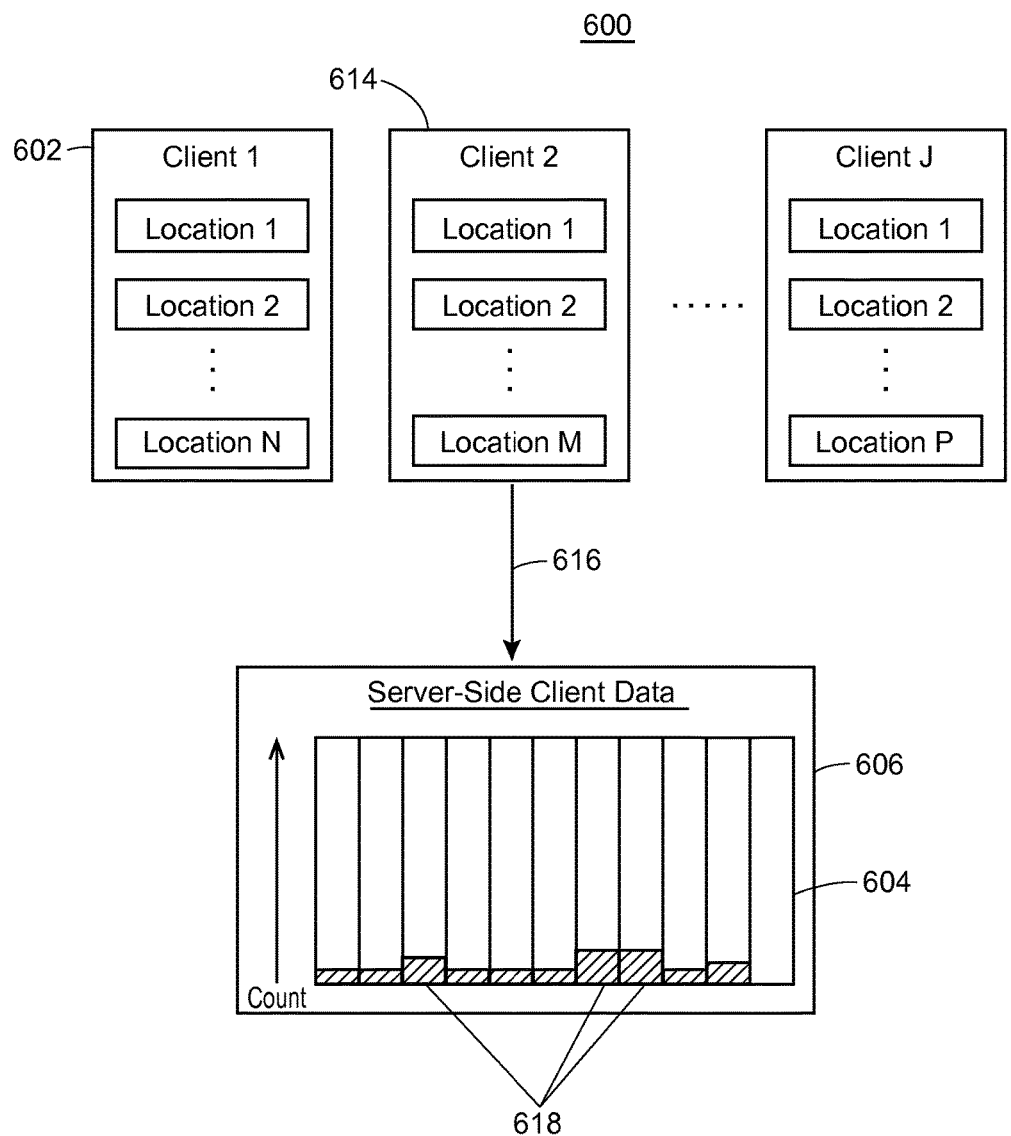
Figure 6C:
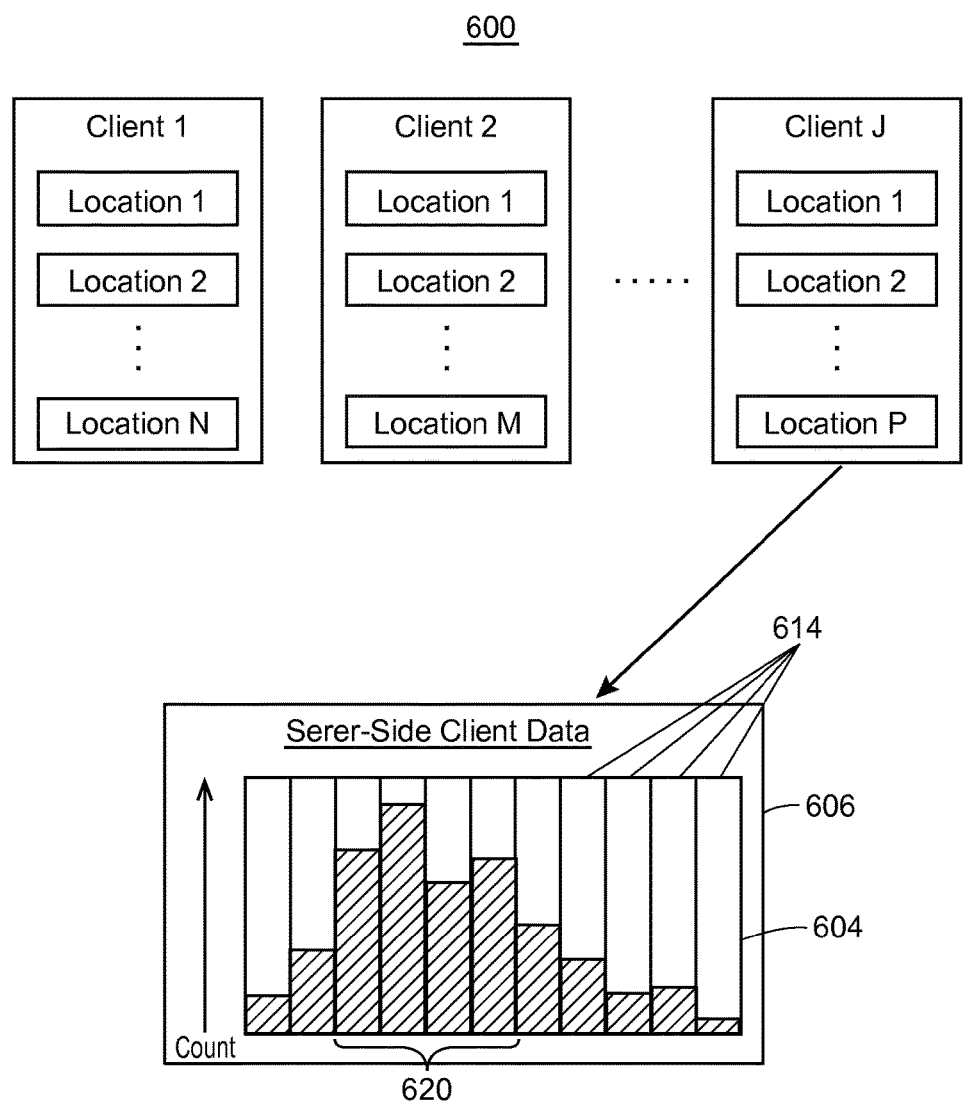

In certain scenarios, data may be gathered from client devices or otherwise stored outside of the client computing device 102, but only when a user gives consent to such use of the data. Where any data is used or stored outside the client device 102, the data is anonymized such that no recognizable link exists between the gathered data and the user. In some embodiments, "hashing" techniques may be utilized to ensure the anonymity of users. FIGS. 6A, 6B, and 6C illustrate an example secure private data model in which user specific data is mapped to a data set of fixed length (i.e., it is "hashed") to insure user anonymity.

FIG. 6A illustrates one example of a data transfer 600 from a first client (e.g., "Client 1") 602 to a fixed data set 604 within a server-side client data structure 606, as illustrated by an arrow 608. In one scenario, the data from Client 1 602 may include a plurality of precise locations (location 1-N) 610. When the data from Client 1 602 is transferred to the fixed data set 604, the data from Client 1 602, which may be of any variable length/size, is mapped to the fixed data set 604 which has a fixed length/size, in an embodiment.

The transfer 600 may involve one or more hash functions, as known in the art, such that the hashed client data may not be used to track the client device 102, in an embodiment. For example, the transfer of locations 1-N 610 from Client device 1 602 may involve a hash function that transforms the precise location into anonymous counts 612 in a series of data bins (illustrated by vertical bars) 614. Each of the counts 612 may include an integer number from which a location of an individual client device 102 cannot be determined precisely, for example.

If the fixed data set 604 included hashed data from Client 1 602 alone, the fixed data set 604 may not be useful for data analysis, in some scenarios. However, hashed data from other client devices may also be added to the fixed data set 604. FIG. 6B, illustrates the transfer of data 600 from Client 2 614 to the fixed data 604, indicated by an arrow 616. After hashing data from Client 2 614, a subset of the data bins 618 may start to include counts from both Client 1 602 and Client 2 614, in a scenario. In some embodiments, a server 104 executes a function to hash data from all clients with the same hash function, and, in other embodiments, a server 104 executes a function to hash data from each client with a different hash function.

After data from all of the client devices (e.g., Client 1, Client 2, . . . Client J) is mapped to the fixed data set 604, data analysis may reveal certain trends 620 in the hashed data, as illustrated in FIG. 6C. Although a server may not infer precise locations from individual counts or bins within the fixed data set 604, a server may be able to collectively identify areas of interest 620 based on hashed data from many client devices in multiple data bins 614, in an embodiment. For example, assuming the fixed data set 604 represents counts of wrong turns during navigation, the server 104 may execute a function to analyze the fixed data set 604 to determine a certain "problem area" (i.e., the area of interest 620) in which users are missing many turns, even though individual locations at which wrong turns are made cannot be inferred from the fixed data set 604. In such a way, data transfer transactions 600 using the example secure private data model (as illustrated in FIGS. 6A, 6B, and 6C) may ensure user anonymity, while, at the same time, facilitating useful data analysis.

Figure 7:
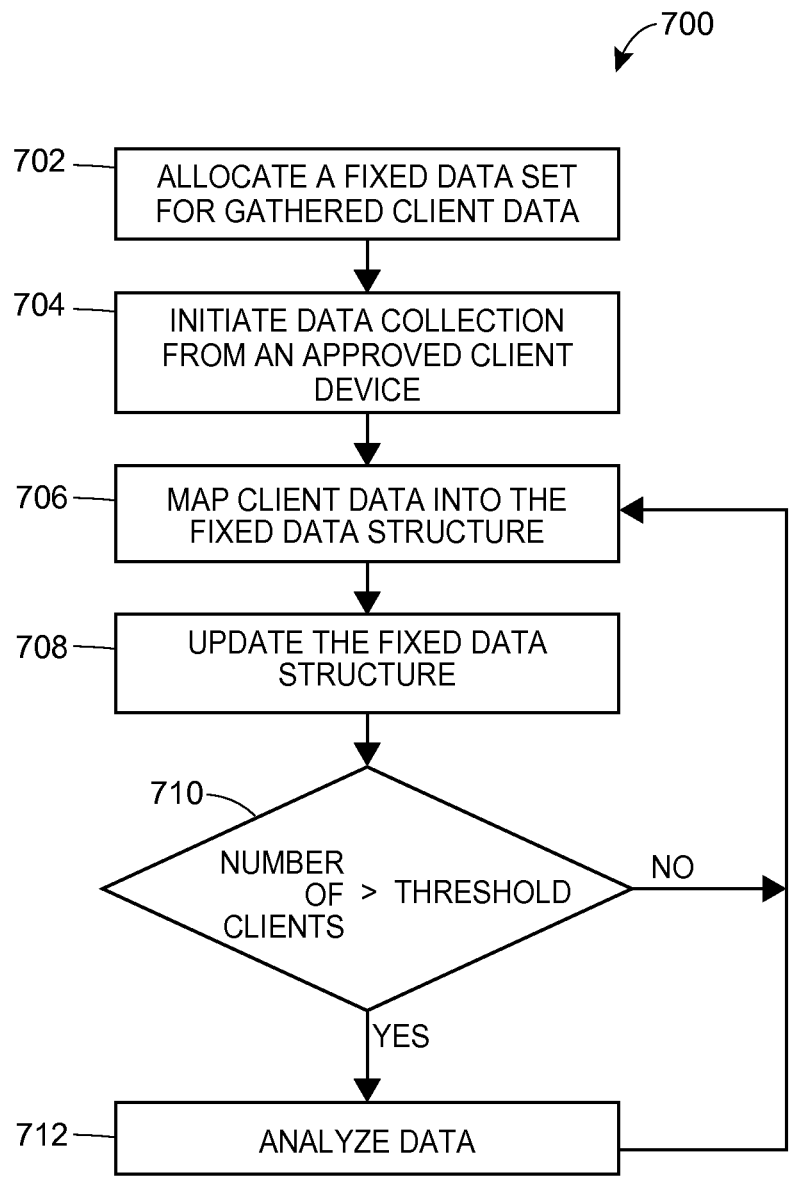
FIG. 7 is a flow diagram of an example method for mapping client data to a fixed data set, such as in the secure private data model illustrated in FIGS. 6A-6C.

FIG. 7 is a flow diagram of an example method 700 for mapping data to a fixed data set 604 (FIGS. 6A, 6B, and 6C) and analyzing the mapped data. The method 700 may be implemented as one or more instructions stored in tangible, computer-readable memory and executed by one or more processors of the example computing system 100, for example.

At block 702, a processor of the server 104 may execute an instruction to allocate a fixed data set for gathered data from client devices 102. For example, the instruction may cause the server 104 to allocate space for a fixed data set 604 in the client database 166. In some embodiments, the fixed data set 604 may include a plurality of bins, or other conceptual data structures, for monitoring the number of certain types of events (e.g. wrong turns, off road events, etc.), where an entry in any of the bins cannot be traced back to an individual client device 102 (i.e., data from clients is anonymized).

At block 704, a processor of the server 104 may execute an instruction to receive data from an approved client device 102. For example, the server 104 first receives data indicating user consent for the use of gathered data and/or that the gathered data is a part of a client device group with a number of client devices above a threshold, as discussed herein with reference to FIGS. 4 and 5.

Next (block 706), a processor of the server 104 may execute an instruction to map the gathered client data from a variable data set in the client device to the fixed data set 604. In some embodiments, the mapping involves a hash function executed by the system 100 using the gathered client data which translates a deterministic data structure (e.g., the device database 146) used by the client device to a probabilistic data structure (e.g., the client database 146) used by a server to store client data. For example, the hash function may operate on characters used to store locations (e.g., in latitude and longitude or other types of coordinates) or routes and may result in integer hash values or additions to integer counts.

At block 708, a processor of the server 104 may execute an instruction to update the fixed data set 604 with the mapped, or hashed, values from the instruction of block 706. For example, a hash function corresponding to the client device 102 may hash data in the device database 146 and update a fixed data set 604 in the client database 166. In some embodiments, the update of the fixed data set 604 involves an addition or subtraction to a count, such that aggregated data may be used to identify "heavy hitters" (i.e. frequent or prominent locations, areas, events, etc.).

In some embodiments, a processor of the system 100 may execute an instruction to determine if a number of client devices having data that has been mapped to the fixed data set 604 is greater than a threshold value (block 710). In this way, a further level of privacy protection is added to the method 700, as discussed in more detail with reference to FIGS. 4 and 5. If the number of client devices is not greater than the threshold, the flow 700 may revert to block 504 where more client data may be gathered. However, if the number of client devices is greater than the threshold, the flow continues to block 712 where the fixed data set is analyzed.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a tangible machine memory (e.g., a computer memory). These algorithms or symbolic representations are examples of techniques used by those of ordinary skill in the data processing arts to convey the substance of their work to others skilled in the art. As used herein, an "algorithm" or a "routine" or a "block" is a self-consistent sequence of operations or similar processing leading to a desired result. In this context, algorithms, routines, blocks, and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment or embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for utilizing secure private data models to customize map content through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for ensuring anonymity of travel and navigation data, the method comprising: receiving an indication of consent to analyze navigation data; receiving navigation data including a plurality of precise geographic locations at a remote mapping server from a plurality of client computing devices via a computer network, the received plurality of precise geographic locations being represented by map content data stored at the remote mapping server, wherein the precise geographic location includes a variable length; mapping the received plurality of precise geographic locations to a fixed data set that includes a plurality of data bins, wherein the fixed data set includes a fixed length, and wherein mapping the received plurality of precise geographic locations to a fixed data set includes (i) hashing each of the received plurality of precise geographic locations with a hash function, and (ii) mapping each of the plurality of hashed precise geographic locations into a corresponding data bin, to transform the plurality of precise geographic locations into anonymous counts; and identifying an area of interest based on an anonymous count of hashed precise geographic locations within a subset of the plurality of data bins.

2. The method of claim 1, wherein identifying the area of interest includes determining if a number of client computing devices having hashed precise geographic locations mapped to the plurality of data bins is greater than a threshold value.

3. The method of claim 2, further comprising analyzing navigation data corresponding to client computing devices having hashed precise geographic locations mapped to the plurality of data bins that are greater than the threshold value.

4. A mapping system configured to ensure anonymity of travel and navigation data, the system comprising: a remote mapping server including a processor and a memory, the memory including instructions executed on the processor to: receive an indication of consent to analyze navigation data; receive navigation data including a plurality of precise geographic locations at a remote mapping server from a plurality of client computing devices via a computer network, the received plurality of precise geographic locations being represented by map content data stored at the remote mapping server, wherein the precise geographic location includes a variable length; map the received plurality of precise geographic locations to a fixed data set that includes a plurality of data bins, wherein the fixed data set includes a fixed length, and wherein mapping the received plurality of precise geographic locations to a fixed data set includes (i) hashing each of the received plurality of precise geographic locations with a hash function, and (ii) mapping each of the plurality of hashed precise geographic locations into a corresponding data bin, to transform the plurality of precise geographic locations into anonymous counts; and identify an area of interest based on an anonymous count of hashed precise geographic locations within a subset of the plurality of data bins.

5. The system of claim 4, wherein the instruction to identify the area of interest includes an instruction to determine if a number of client computing devices having hashed precise geographic locations mapped to the plurality of data bins is greater than a threshold value.

6. The system of claim 5, further comprising an instruction to analyze navigation data corresponding to client computing devices having hashed precise geographic locations mapped to the plurality of data bins that are greater than the threshold value.

* * * * *